May 20, 1947. W. A. PIPKIN 2,420,678
CITRUS PEEL OIL EXTRACTION
Filed July 3, 1944
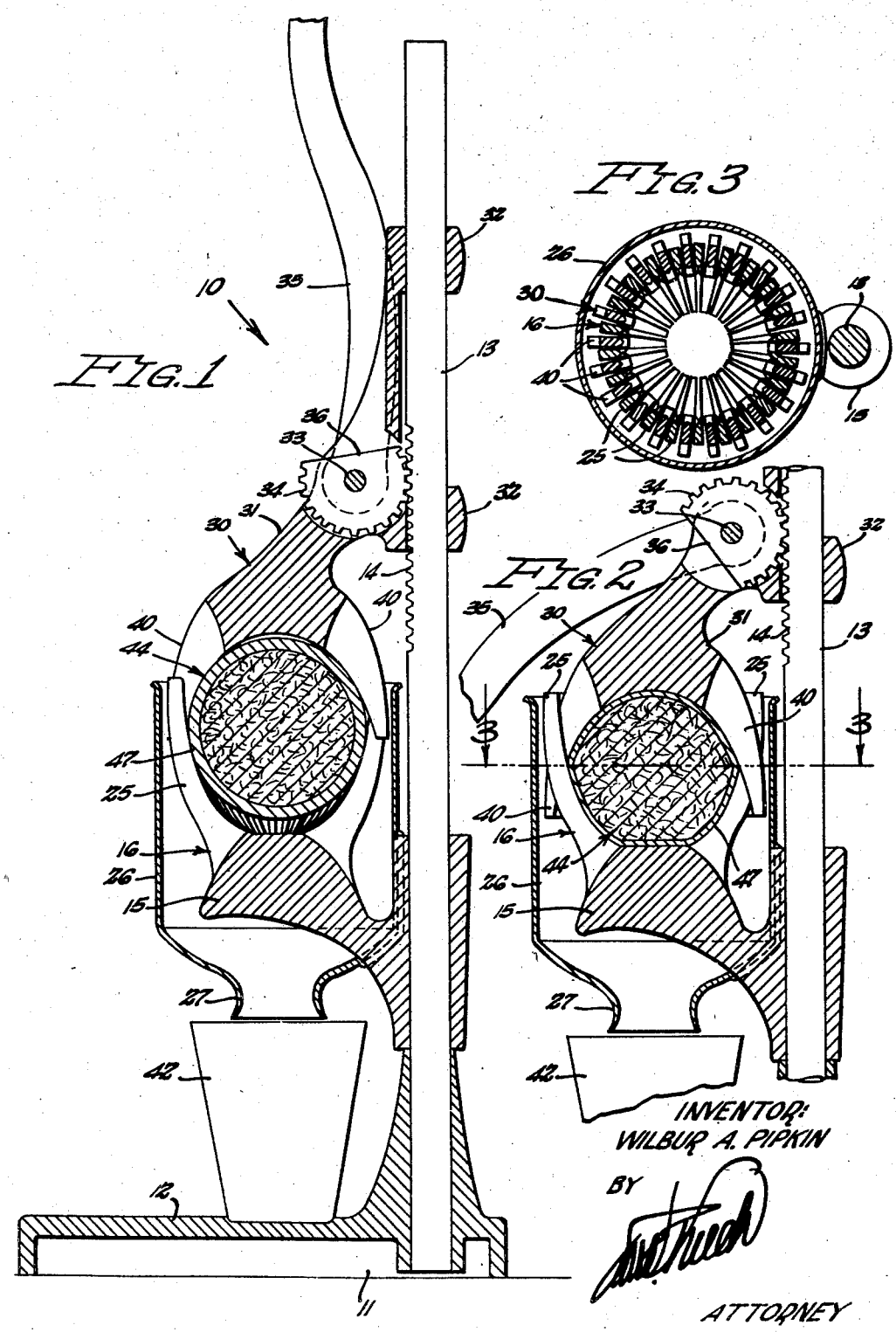
INVENTOR:
WILBUR A. PIPKIN
BY
ATTORNEY Patented May 20, 1947

2,420,678

UNITED STATES PATENT OFFICE 2,420,678

CITRUS PEEL OIL EXTRACTION

Wilbur A. Pipkin, Safety Harbor, Fla.

Application July 3, 1944, Serial No. 543,394

3 Claims. (Cl. 100—42)

This invention relates to the extraction of peel oil from citrus fruits. The best grades of citrus peel oil are recovered from the citrus rind by pressure thereagainst at atmospheric or lower temperatures, and without mixing the peel oil with any of the juice from the fruit.

It is an object of my invention to provide a novel method of and apparatus for extracting peel oil from citrus fruit under the preferable conditions above outlined.

In order to prevent mingling juice with the peel oil, attempts have been made to free the peel oil from the rind by abrasion and capture this before the fruit is subjected to a juice extracting process.

It is another object of my invention to provide a novel method of and apparatus for extracting peel oil from whole citrus fruit without causing the escape of juice from the fruit.

The manner of accomplishing the foregoing objects, as well as further objects and advantages, will be made manifest in the following description taken in connection with the accompanying drawings in which:

Fig. 1 is a vertical sectional view of a preferred embodiment of the apparatus of my invention illustrating an initial step in the performance of the method thereof.

Fig. 2 is a view similar to Fig. 1 and illustrates a concluding step in the performance of the method of my invention.

Fig. 3 is a cross sectional view taken on the line 3—3 of Fig. 2.

Referring specifically to the drawings, an apparatus 10, shown therein for illustrative purposes, permits the method of my invention to be performed by hand. This apparatus includes a base 11, providing a platform 12, on which is fixed a vertical standard or post 13, having a section thereof toothed to provide a rack 14. The post 13 has fixed thereon a lower cup body 15 on which is formed a lower cup 16. The lower cup 16 includes a series of fingers 25 which are formed integral with body 16 and radiate with respect to the axis of the cup in uniformly spaced relation with each other. Mounted on the body 15 and surrounding the cup 16 is a rind oil collector 26 having a spout 27.

Disposed above the cup 16 is an upper cup 30 having a body 31 on which are provided slide collars 32 which slidably fit the post 13. Also rotatably mounted on the body 31 is a shaft 33 on which is fixed a gear sector 34 which is adapted to mesh with the rack 14, and a handle 35 for rotating this sector. When the gear sector 34 is rotated so that a flat side 36 thereof is disposed adjacent the post 13, the cup 30 may be freely slid upwardly on the post 13.

The cup 30 is always co-axial with respect to the lower cup 16 and has fingers 40 which are disposed radially with respect to the common axis of the cups and in uniformly spaced relation so as to extend between the fingers 25, when the cup 30 is lowered, to effect an interdigitating relation between said cups.

Operation

To perform the method of my invention with the apparatus 10, a container 42 is first placed on the platform 12 beneath the spout 27 to receive the peel oil extracted by the method. The shaft 33 is now rotated by manipulation of the handle 35 to bring the flat side 36 of the gear sector 34 opposite the post 13. The cup 30 and associated parts is then slid upwardly on the post 13 to present a gap between the lower and upper cups into which a whole citrus fruit such as an orange 44 may be inserted. The cup 30 is now permitted to drop downwardly on the orange 44, the handle 35 is next rotated to bring the gear sector 34 into meshing relation with the rack 14 and the gear sector further rotated when so meshed, to force the cup downwardly and compress the orange 44 between this cup and the lower cup 16.

An initial phase of this compression is shown in Fig. 1 where it is seen that the orange has not yet been forced to conform to the inner surfaces of the cups 16 and 30. The downward movement of the cup 30, of course, is continuous and rapidly passes through this phase of the compression to the point where the orange conforms with the cups and the hydraulic pressure of the juice-bearing structure within the orange resists further movement of the cups together.

This resistance results in the compression of the rind 47 itself between the juice-bearing structure and the cups as clearly shown in Fig. 2 so as to rupture the oil cells in the rind and release the peel oil therefrom. The peel oil, thus extracted, spurts or flows outwardly onto the fingers 25 and 40, is collected in the collector 26 and drains downwardly through the spout 27 into the container 42.

The compression of the orange 44 to the extent illustrated in Fig. 2, to extract the major portion of the peel oil from the rind 47 thereof, may be accomplished rapidly. At the conclusion of the downward stroke of the upper cup 30 it may be retracted immediately by reversing the direction of rotation of the gear sector 34. The orange 44 is then removed from the lower cup 16 and a fresh orange inserted for a repetition of the oil extraction process.

An outstanding advantage of the method of my invention is that it is a so-called "cold" process in that the extraction takes place at atmospheric or lower temperatures. Furthermore, there is no necessity to dilute the peel oil with water, thereby losing some of the volatiles therefrom in the process of separating the oil from the water.

After being treated by my process the oranges are ready to have the juice extracted from them by any of the methods in common commercial use, following which, the rinds of the oranges are suitable for use in marmalade manufacture.

I claim:

1. A method of extracting peel oil from a whole citrus fruit which comprises providing support for all areas of the rind of said fruit which is adequate to prevent local outward bursting of the juice-bearing structure when said structure is subjected to relatively high pressure; and while maintaining said support, compressively reducing the volume of the space within the boundaries of said support to produce such a high internal pressure in said structure as to compress said rind and force peel oil therefrom; and collecting said peel oil.

2. A method of extracting peel oil from whole citrus fruit which consists in: constricting said fruit by the simultaneous and continuous application of substantially uniform but constantly increasing compressive forces on all portions of said rind at points sufficiently close to each other as will prevent the juice-bearing structure exploding outwardly through said rind, said constriction operating to compress said rind, and express the peel oil therefrom.

3. An apparatus for extracting peel oil from whole citrus fruit comprising a pair of cups having inter-digitating fingers; and means for bringing said cups together to embrace a whole citrus fruit with said fingers in inter-digitating relation to compress said fruit and constrict the same to express peel oil from said rind by the simultaneous and continuous application of compressive forces on all portions of said rind at points sufficiently close to each other as will prevent the juice-bearing structure of the fruit exploding outwardly through said rind during the expression of the peel oil.

WILBUR A. PIPKIN.

REFERENCES CITED

The following references are of record in the file of this patent:

UNITED STATES PATENTS

| Number | Name | Date |
| --- | --- | --- |
| 1,960,501 | Maull | May 29, 1934 |
| 382,774 | Shea | May 15, 1888 |
| 1,734,534 | Shields | Nov. 5, 1929 |

FOREIGN PATENTS

| Number | Country | Date |
| --- | --- | --- |
| 768,115 | France | May 14, 1934 |
| 279,632 | Italy | Nov. 18, 1930 |